(12) United States Patent
Sandholzer et al.

(10) Patent No.: US 9,102,349 B2
(45) Date of Patent: Aug. 11, 2015

(54) ELECTRICALLY SUPPORTED POWER STEERING HAVING AN IMMBOLIZER

(75) Inventors: Julian Sandholzer, Altach (AT); Max Oertle, Mauren (LI)

(73) Assignee: ThyssenKrupp Presta AG, Eschen (LI)

( * ) Notice: Subject to any disclaimer, the term of this patent is extended or adjusted under 35 U.S.C. 154(b) by 17 days.

(21) Appl. No.: 14/004,614

(22) PCT Filed: Mar. 9, 2012

(86) PCT No.: PCT/EP2012/001063
§ 371 (c)(1),
(2), (4) Date: Oct. 16, 2013

(87) PCT Pub. No.: WO2012/123091
PCT Pub. Date: Sep. 20, 2012

(65) Prior Publication Data
US 2014/0034411 A1 Feb. 6, 2014

(30) Foreign Application Priority Data

Mar. 11, 2011 (DE) .......................... 10 2011 013 714
Mar. 14, 2011 (DE) .......................... 10 2011 013 957

(51) Int. Cl.
*B62D 5/04* (2006.01)
*B62B 1/16* (2006.01)
*B60R 25/021* (2013.01)

(52) U.S. Cl.
CPC ............. *B62B 1/16* (2013.01); *B60R 25/02107* (2013.01); *B60R 25/02147* (2013.01); *B62D 5/04* (2013.01); *B62D 5/0409* (2013.01)

(58) Field of Classification Search
CPC ....................................................... B62D 1/16
USPC ............................................ 180/444; 70/183
See application file for complete search history.

(56) References Cited

U.S. PATENT DOCUMENTS 5,921,355 A 7/1999 Mostrom
7,077,235 B2 * 7/2006 Eda et al. ....................... 180/444
7,306,535 B2 * 12/2007 Menjak et al. .................. 475/29

(Continued)

FOREIGN PATENT DOCUMENTS

DE 20103203 U1 7/2001
DE 60306694 T2 7/2007

(Continued)

OTHER PUBLICATIONS

International Preliminary Report on Patentability issued in PCT/EP2012/001063, issue date Sep. 17, 2012.
International Search Report and Written Opinion issued in PCT/EP2012/001063, mail date Aug. 17, 2012, with English translation of International Search Report.

*Primary Examiner* — Tony Winner
(74) *Attorney, Agent, or Firm* — Panitch Schwarze Belisario & Nadel LLP

(57) ABSTRACT

A steering system is provided with an uninterruptible mechanical positive coupling between a steering wheel and a pinion in the form of a steering shaft and with an electrical auxiliary power assistance, in which an electric motor introduces its assistance power into the steering system via a reduction gear mechanism. A switchable magnetic brake is provided, which in a closed switching state blocks the motor shaft of the electric motor frictionally in relation to a motor housing fixed to the vehicle body, and which in an open switching state releases the motor shaft so that this can rotate in a fixed transmission ratio with the steering shaft.

11 Claims, 6 Drawing Sheets

(56) References Cited

U.S. PATENT DOCUMENTS

Figure 1:
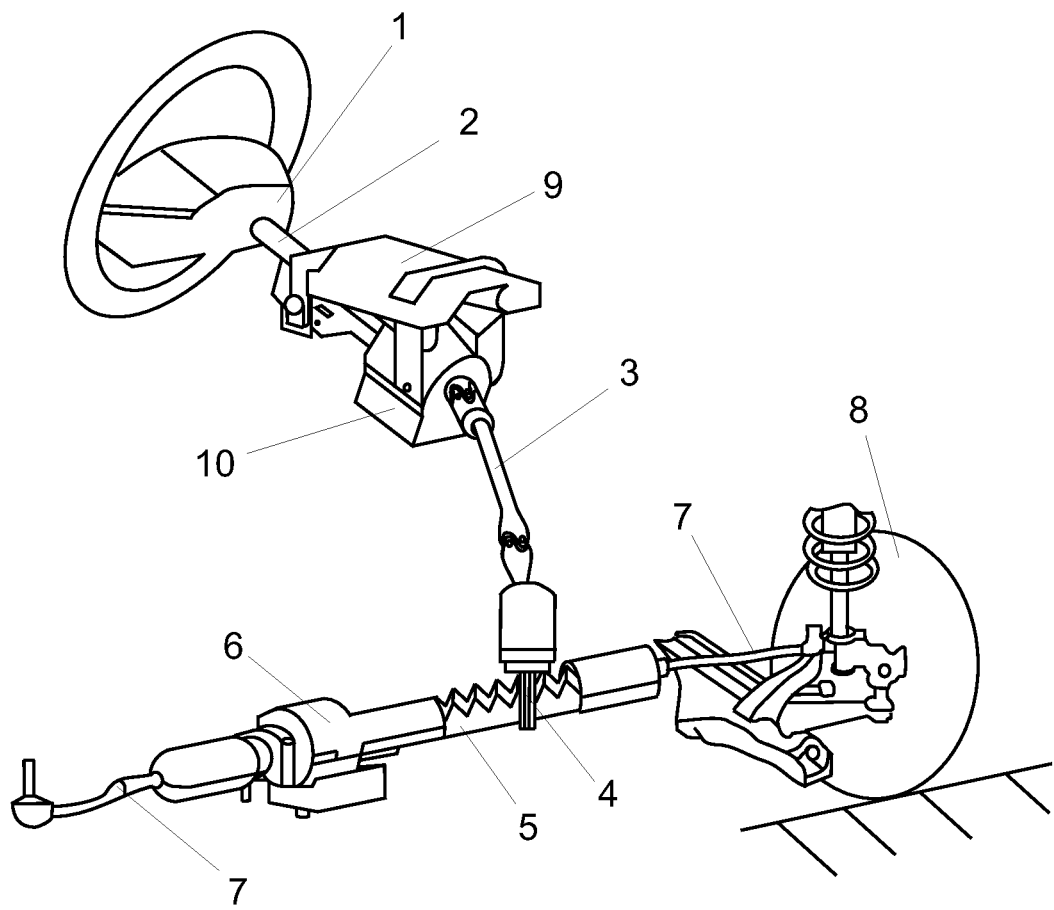

| | | | |
|---|---|---|---|
| 7,523,805 B2 * | 4/2009 | Imagaki et al. | 180/444 |
| 7,591,341 B2 * | 9/2009 | Shimamoto et al. | 180/444 |
| 2006/0226942 A1 | 10/2006 | Dimig et al. | |

FOREIGN PATENT DOCUMENTS

| | | |
|---|---|---|
| EP | 1329368 A2 | 7/2003 |
| EP | 1568554 B1 | 11/2009 |

* cited by examiner

ELECTRICALLY SUPPORTED POWER STEERING HAVING AN IMMBOLIZER

CROSS-REFERENCE TO RELATED APPLICATIONS

This Application is a National Stage of PCT International Application No. PCT/EP2012/001063, filed on Mar. 9, 2012, and claims priority of German Patent Application Nos. 102011013714.9, filed on Mar. 11, 2011, and Ser. No. 10/201, 10139575, filed on Mar. 14, 2011. The disclosures of the aforementioned applications are incorporated herein in their entirety by reference.

The present invention relates to a steering system with an uninterruptible mechanical positive coupling between a steering wheel and a pinion in the form of a steering shaft and with an auxiliary shaft that is coupled in a torque-resistant manner to the steering shaft (2) via a reduction gear. Such steering systems are known in particular as steering systems with an electrical auxiliary power assistance, in which an electric motor introduces its power assistance into a steering gear via a reduction gear. In particular the reduction gear can be formed as a worm gear transmission. Such worm gear transmissions are preferably arranged in the steering train between the steering wheel and the engagement of the pinion in the steering rack. Steering systems of this construction are termed "column power assisted steering systems" or COL-PAS.

A general requirement placed on such steering systems, with and without auxiliary power assistance, is to provide a vehicle immobiliser that ensures that the rotation of the steering spindle is locked up to a predeterminable torque. A number of solutions to this problem exist in the prior art.

EP 1568554 B1 discloses a solution for a locking arrangement, in which a locking star wheel is used that can be locked to the casing unit by a locking pin and slips through onto the steering spindle if a predetermined torque is exceeded. In this way it is ensured that on the one hand the steering spindle cannot be damaged by too high a torque if the vehicle is stolen, and that on the other hand a rotation of the steering spindle is possible only by applying a correspondingly high predetermined torque. In this way the controlled driving of the vehicle can be prevented and the object of the vehicle immobiliser is fulfilled.

The disadvantage of this solution however is that the braking force must be designed for relatively high torques in the range from about 100 Nm to 300 Nm. The locking system consisting of locking pin and locking star wheel must be of a correspondingly robust and complicated construction.

In DE 60306694 T2 it is therefore proposed to allow the locking device, which is actuated with an electromagnetic actuator, to engage on an engagement section that is arranged on the shaft of the servomotor or on a shaft connected in a torque-resistant manner to this shaft. A mechanical overload protection is not disclosed in this application, so that in the event of misuse the steering spindle can be subjected to very high torques.

The object of the invention is therefore to provide a vehicle immobiliser that is of simple and compact construction as possible but nevertheless fulfills the requirements described above.

This object is achieved by a steering system having the features of claim 1.

The object is achieved starting from a steering system with an uninterruptible mechanical positive coupling between a steering wheel and a pinion in the form of a steering shaft and with an auxiliary shaft that is coupled in a torque-resistant manner via a reduction gear to the steering shaft (2), wherein a switchable magnetic brake is provided, which in a closed switching state frictionally blocks the auxiliary shaft with respect to a holder fixed to the vehicle body, and which in an open switching state releases the auxiliary shaft so that this can rotate in a fixed transmission ratio with the steering shaft.

The invention can be applied in particular to steering systems in which the auxiliary shaft is formed by a motor shaft of a servomotor of an electrical auxiliary power assistance or is coupled in a torque-resistant manner to a motor shaft of a servomotor of an electrical auxiliary power assistance that introduces an assistance torque into the steering system via the reduction gear. In this connection the holder fixed to the vehicle body is advantageously formed by a motor housing of the servomotor of the electrical auxiliary power assistance arranged securely on the vehicle body. The torque-resistant coupling is in turn understood to mean that the rotational speeds of the two shafts coupled in a torque-resistant manner do not have to be the same.

The magnetic brake can be used in various implementations, which are described in more detail hereinafter. The implementations include components that are termed anchor plates or anchor discs. The term anchor is employed hereinafter as a generic term for the various implementations. The brake has exclusively the function of a vehicle immobiliser and not the function of an emergency brake in the event of a malfunction of the electric motor. It can be actuated by the control system in such a way that a switching of the brake to the closed state is possible only when the vehicle is stationary and the engine is switched off. The holder is fixed to the vehicle body and when the auxiliary shaft is blocked by the gear construction of the gear system, which is not described in more detail, the rotation of the steering spindle is likewise blocked.

The necessary blocking torque of the brake is attained when a frictional gripping force is produced between the anchor and the yoke by means of a magnetic force. In this connection, in order to achieve more accurately defined frictional values between the anchor and the yoke a friction lining or a coating that increases the static friction can be provided.

Preferably the reduction gear is implemented as a worm gear transmission.

A spring can be provided that tensions the magnetic brake into the open position.

The gear arrangement can be a coaxial gear, which allows a particularly compact construction.

In the case of the steering system with electrical auxiliary power assistance the electric motor with its output shaft, which encloses the steering spindle, then correspondingly drives the gear arrangement in order to provide the servo assistance. The brake is fixed on the output shaft of the electric motor, preferably at the end remote from the gear side. Since the gear housing and the brake are arranged fixed to the vehicle body, the motor shaft and the steering spindle shaft are rotatably mounted with respect to the brake and the housing.

The anchor is in a preferred implementation itself formed resiliently as a brake disc, so that no separate spring is required in order to release the brake disc.

The magnetic brake can be shielded against external magnetic fields by a suitable encapsulation, so that a release of the magnetic brake either unintentionally due to interference effects or by misuse due to manipulation by means of external fields, is not possible.

If desired a permanent magnet is additionally provided in the anchor or in the magnet yoke, which produces a magnetic field at all times.

The magnetic force of the permanent magnet is in this connection chosen so that it is insufficient to produce an axial movement between the anchor and yoke and close the air gap and thereby convert the brake into the closed state. When the brake is closed the braking torque is thus however advantageously increased due to the additional magnetic force of the permanent magnet.

By appropriate design of the anchor and yoke and of the housing parts and shaft for an optimal magnetic flow, a larger force of attraction between the anchor and yoke can be generated.

Figure 2:
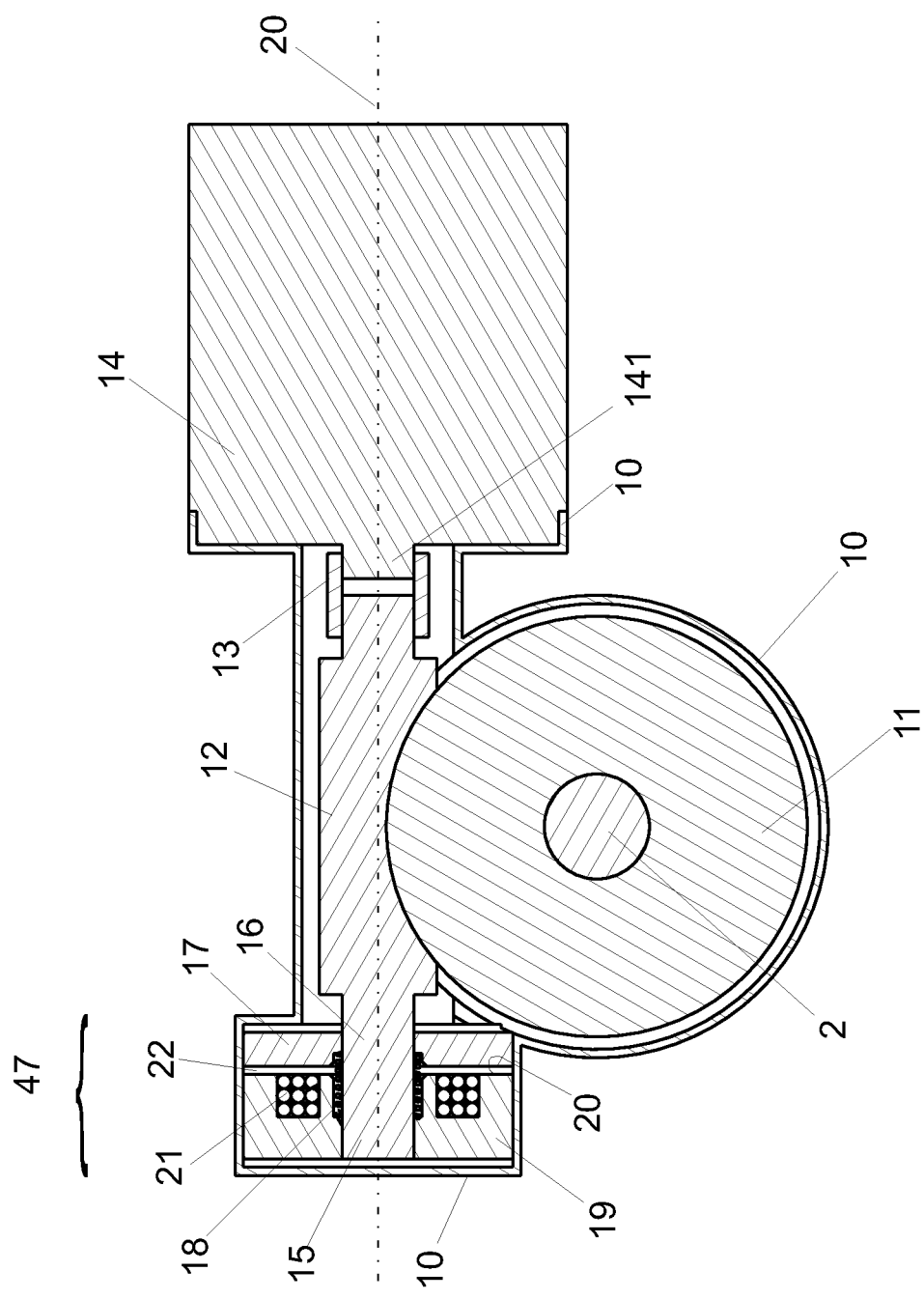
Figure 3:
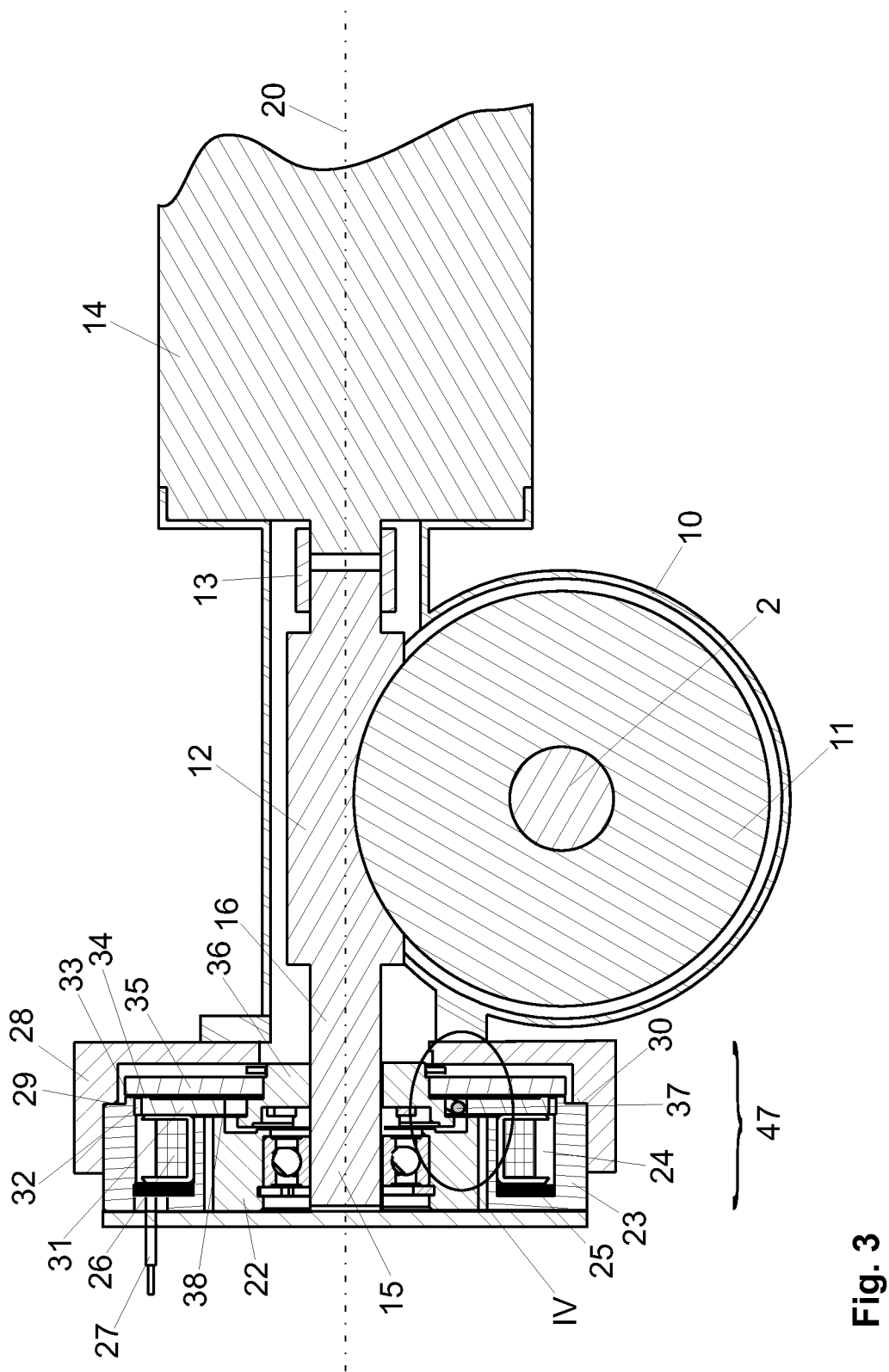
Figure 4:
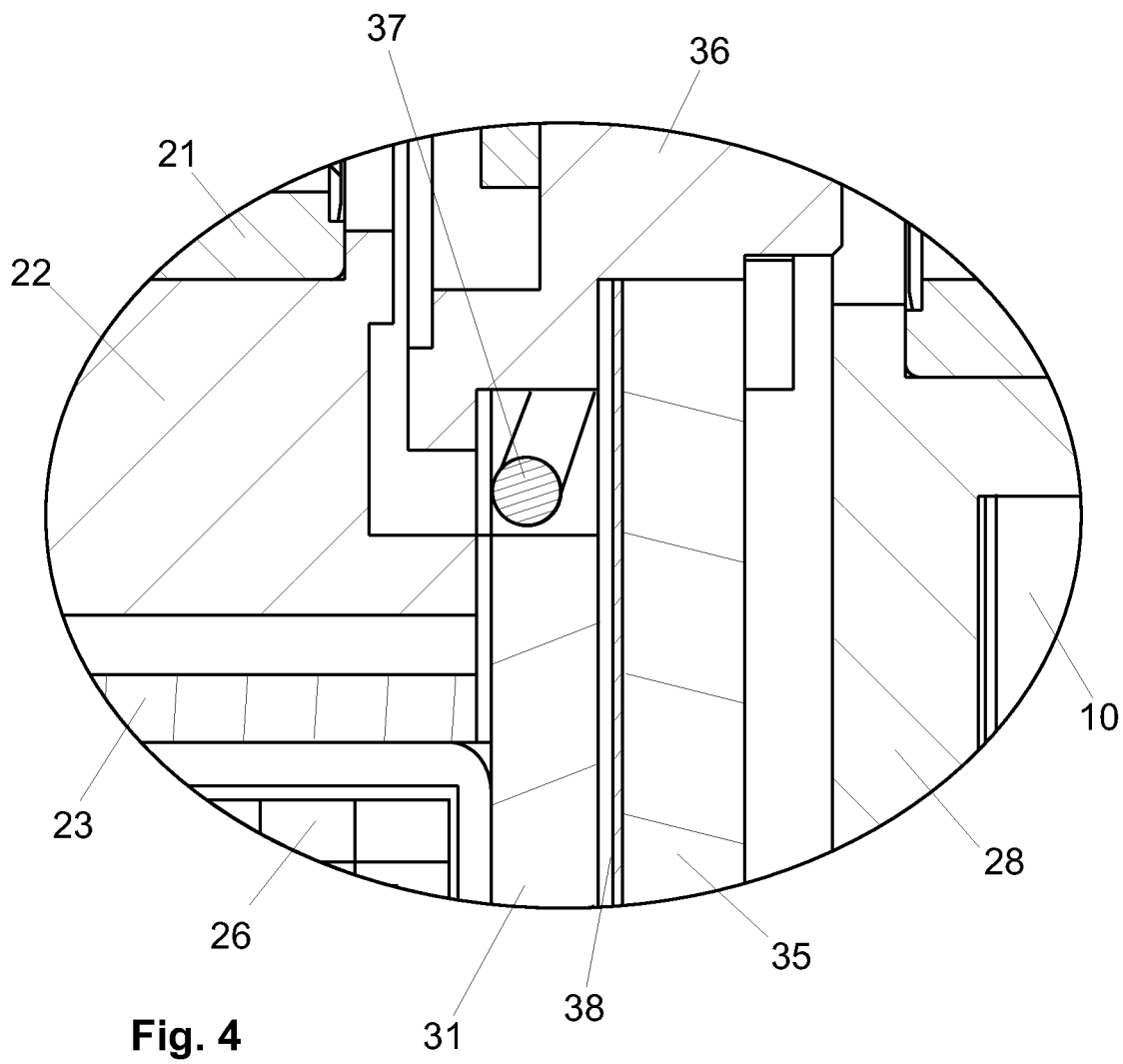
Figure 6:
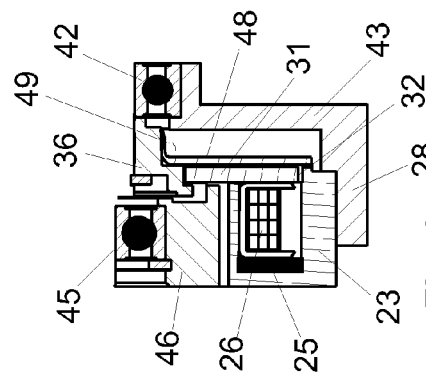
Figure 7:
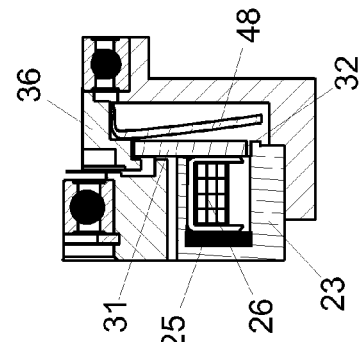
Figure 5:
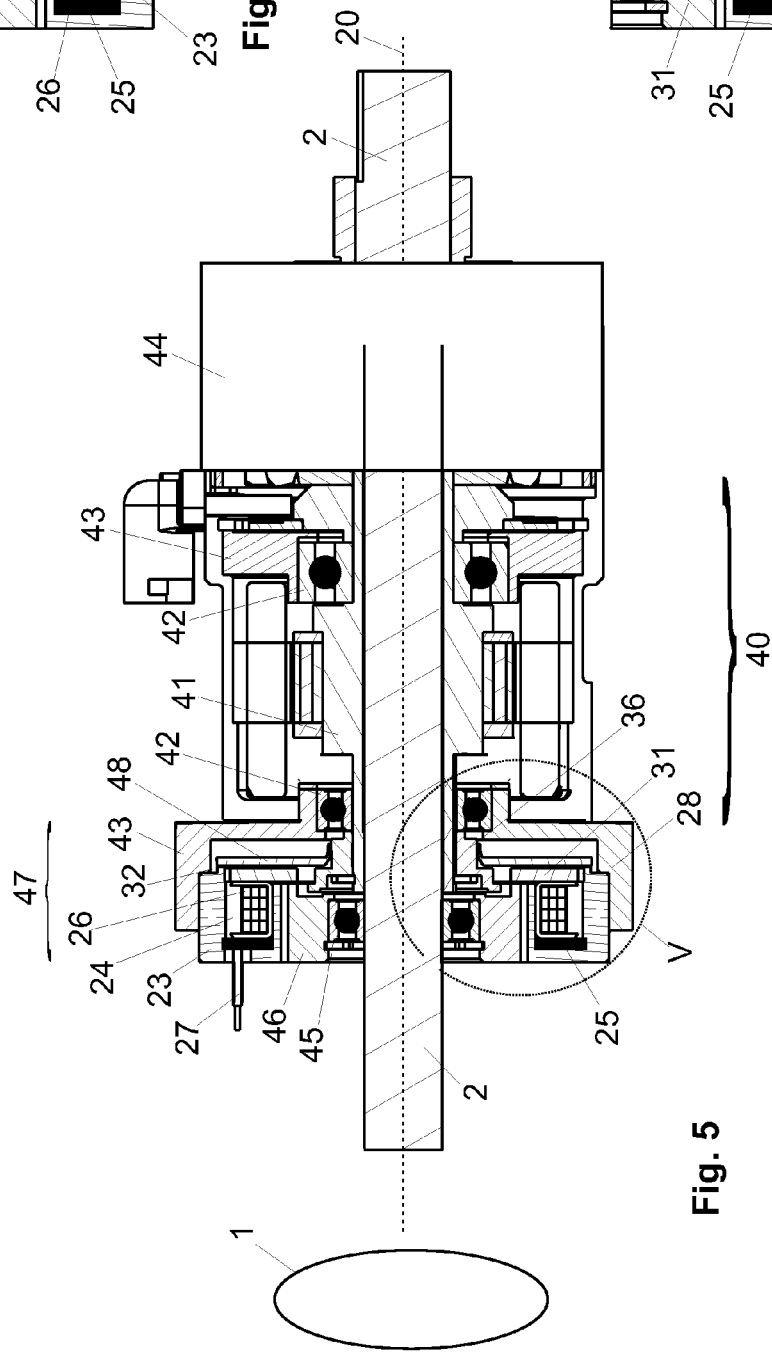
Figure 8:
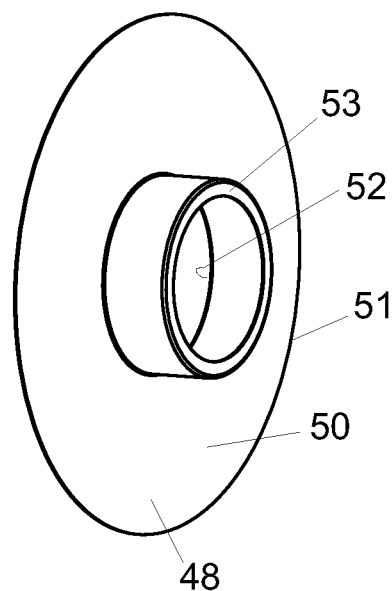
Figure 9:
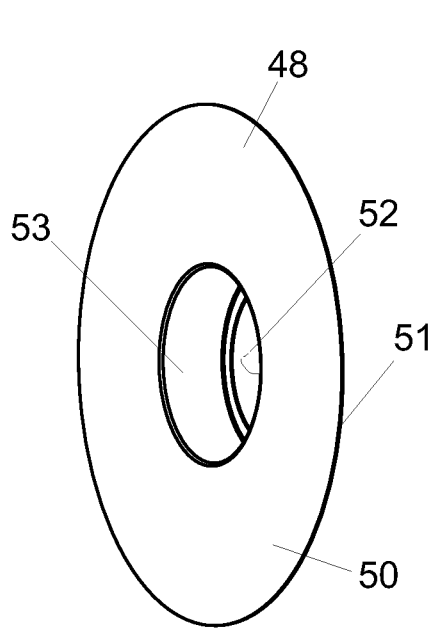

Exemplary embodiments of the present invention are described in more detail hereinafter with the aid of the drawings, in which:

FIG. 1: is a schematic perspective representation of an electromechanical steering system;

FIG. 2: is a schematic representation of a longitudinal section through a servo drive for the steering system according to FIG. 1;

FIG. 3: is a longitudinal section similar to FIG. 2 with a different vehicle immobiliser in the locked position;

FIG. 4: shows the detail IV of FIG. 3 in an enlarged representation in the open position;

FIG. 5: is a longitudinal section through a servo drive with a further implementation of the vehicle immobiliser;

FIG. 6: shows the detail V of FIG. 5 in a first switching position;

FIG. 7: shows the detail V of FIG. 5 in a second switching position;

FIG. 8: is a perspective representation of a brake disc;

FIG. 9: shows the brake disc of FIG. 8 seen from the rear side; and

Figure 10:
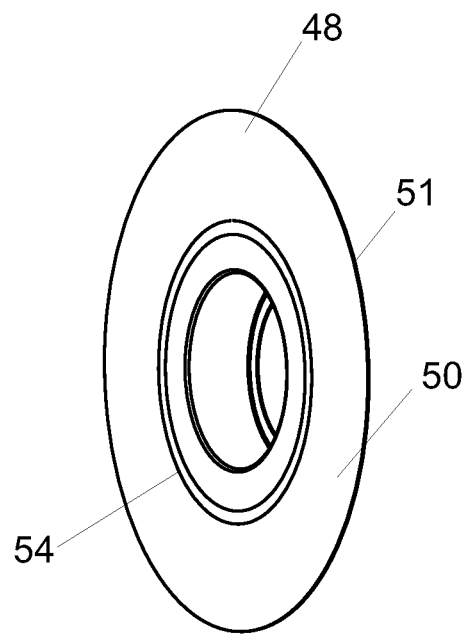

FIG. 10: is a brake disc corresponding to FIG. 8 and FIG. 9 with an elastically deformable region.

FIG. 1 shows a steering system for a vehicle with a steering wheel 1, which is connected in a torque-resistant manner to an upper steering shaft 2. The upper steering shaft 2 is connected via a Cardan joint or a similar torque-resistant connection to a lower steering shaft 3, which is finally connected to a pinion 4. A rotation of the steering wheel 1 consequently produces an equally fast rotation of the pinion 4 in the same direction.

The pinion 4 engages in a known manner with a gear rack 5 that is displaceably mounted in a steering housing 6. The gear rack 5 is connected at its free end to track rods 7, which under an axial movement of the gear rack 5 in the steering housing 6 finally turn steerable wheels 8 of the vehicle.

The upper steering shaft 2 is axially and radially adjustably mounted in a known manner in a bracket 9. The bracket 9 is fixed to the vehicle body and also carries a housing 10 with a servo drive acting directly on the upper steering shaft 2. The servo drive serves to reduce the torque to be applied to the steering wheel 1, which is required to turn the wheels 8. The steering system according to the invention is not a so-called superposed steering, in which a separation between the upper steering shaft 2 and the pinion 4 is possible in order to superimpose an additional steering angle. As far as the Cardan joint and a possible torque sensor based on a torsion spring there is a rotationally rigid connection between the steering wheel 1 and the steering wheel at 4.

An embodiment of a servo drive is illustrated in FIG. 2, which can be arranged in the housing 10 of FIG. 1.

FIG. 2 shows a cross-section through the upper steering shaft 2, on which a worm wheel 11 is arranged in a torque-resistant manner. The worm wheel 11 engages with a worm shaft 12, which is coupled in a torque-resistant manner via a preferably elastic connection 13 to the motor shaft 141 of a servomotor 14 illustrated only schematically. When current is fed to the servomotor 14 this consequently leads to a rotation of the worm shaft 12 and, with the corresponding reduction, to a rotation of the steering wheel 2. The reduction that is predetermined by the toothed arrangement of the worm wheel 11 and the worm shaft 12 is utilised in the context of the present invention. At the end of the worm shaft 11 lying opposite the coupling 13 the said shaft is provided with a shaft stub 15, which is mounted in the housing 10, in a manner not shown. The housing 10 is fixed to the body of the vehicle, and can be formed as one part or as several parts. The shaft stub 15 is non-circular in a region 16 adjacent to the worm shaft 12 and carries in a torque-resistant but axially displaceable manner an anchor plate 17, which is formed as a rotationally symmetrical circular disc. The anchor plate 17 is forced by a helical spring 18 in the direction of the servomotor 14. The housing 19 carries in addition a magnet yoke 19, which is fixed in the housing 10. The magnet yoke 19 consequently does not co-rotate, in contrast to the anchor plate 17, when electric current is fed to the electric motor 14. The magnet yoke 19 is formed to be annularly rotationally symmetrical, and has in a front surface 20 facing towards the anchor plate 17 an annular recess that accommodates a winding 21 of an electromagnet. The whole arrangement in the example corresponding to the preferred embodiment is formed substantially rotationally symmetrical to an axis 20, which also coincides with the rotational axis of the electric motor 14.

The magnet yoke 19 is in a cross-section from the axis 20 to the housing 10 formed roughly U-shaped in the radial direction, wherein the winding 21 lies between the two free arms of the U and the U is upwardly open to the anchor plate 17.

The arrangement of anchor plate 17 and magnet yoke 19 is made of a non-magnetisable material, in particular of a ferromagnetic or a ferrimagnetic material with a high coercivity, so that when these components are magnetised a high remanence remains. In this connection it is conceivable and possible to form the anchor plate of various materials. Also, it is not necessary to produce the whole anchor plate 17 and/or the magnet yoke of a non-magnetisable material. The important factor is the formation of a sufficiently strong magnetic field. Due to this choice of material this assembly is suitable as a brake for the worm shaft 12. This is described in more detail hereinafter.

In the illustrated position there is no contact between the anchor plate 17 and the magnet yoke 19. The worm shaft 12 is at its shaft stub 15 freely rotatably mounted in a bearing (not shown). When the electric motor 14 is supplied with current this consequently produces a rotation of the worm shaft 12, which in the region 16 of its non-circular cross-section causes the anchor plate 17 to co-rotate. At the same time the worm wheel 11 and thus the upper steering shaft 2 are also caused to rotate via the toothed arrangement. The electric motor 14 in this way assists, depending on a regulation system, the driver to execute the steering movement, which is triggered by a manual torque exerted on the steering wheel 1.

When the vehicle is not in operation, then according to a legal requirement the steering inter alia must be blocked so as to act as a vehicle immobiliser. A blocking in the sense of this legal regulation then exists if the steering shaft 2 cannot be rotated up to a specified minimum torque, which depending on the regulations is in the range from 100 Nm up to 300 Nm. Depending on the implementation of the vehicle immobiliser, under a higher torque the vehicle immobiliser can slip, though the vehicle immobiliser is not however released, so that a specific steerability of the vehicle is not possible.

In order to achieve such a locking of the steering shaft 2, the winding 21 is supplied with current. The winding 21 acts as an electromagnet and produces in the pot-shaped magnet yoke 19 a magnetic field, whose field lines leave the winding 21 at the front surface 20 opposite the anchor plate 17 and re-enter the winding 21 close to the helical spring 18. Depending on the direction of the current in the winding 21 the direction of the field lines can also be reversed. In a known manner the field lines enter the anchor plate 17 and endeavour to reduce an air gap 22 between the anchor plate 17 and the magnet yoke 19. The anchor plate 17 is attracted magnetically towards the magnet yoke 19, so that the magnetic circuit is closed. The magnetic attraction force between the components thereby overcomes the counterforce of the helical spring 18.

When the anchor plate 17 abuts the magnet yoke 19, the current through the winding 21 can be switched off. With a suitable choice of material for the magnet yoke 19 the remaining residual magnetism after the current has been switched off is so large that a permanent magnetic field exists, which constantly attracts the anchor plate 17 towards the magnet yoke 19. In this way a frictional grip coupling is produced, whose retention torque can be calculated. The frictional force, and by taking account of the diameter the resultant torque that is available for the locking, can be determined from the magnetic force of attraction between the anchor plate 17 and the magnet yoke 19 minus the force of the helical spring 18, and from the coefficient of friction between the anchor plate 17 and the magnet yoke 19. The thereby determined torque is necessary in order to turn the worm shaft 12 together with the abutting anchor plate 17 against the frictional force. This torque can in one exemplary embodiment amount to 12 Nm.

The following calculation example illustrates how the brake can be designed in order to satisfy a specific reduction ratio of the gear arrangement and a specific requirement of the braking torque to be exerted on the steering shaft. The efficiency of the gear reduction was not taken into account for the calculation example. The reduction between the worm wheel 11 and the worm shaft 12 can for example have a ratio of 1 to 20. With this reduction ratio 20 revolutions of the worm shaft 12 are necessary in order to produce one rotation of the worm wheel 11 and thus of the steering shaft 2. The frictional torque on the anchor plate 17 is also transmitted in the same ratio to the steering shaft 2. If the frictional torque with the abutting anchor plate 17 is for example 12 Nm, then a torque of 12 Nm×20=240 Nm on the steering shaft 2 is necessary in order to rotate the anchor plate 17 abutting the magnet yoke 19. This torque satisfies the requirements of the legal regulations. By suitable dimensioning and choice of material other retaining torques can also be accomplished.

In the described switching state, in which on account of the magnetic remanence of the magnet yoke 19 the anchor plate 17 abuts in a frictional locking manner against the magnet yoke 19, the device does not consume any electrical energy since the current through the winding 21 has to be switched on only to generate the remanence and the current can then be switched off again.

In order to release the connection between the anchor plate 17 and the magnet yoke 19 the winding 21 is supplied with current so that the permanent magnetic field in the magnet yoke 19 is cancelled. This cancellation of the magnetisation can be produced by a reverse field of accurately determined strength. Preferably the magnetisation of the magnet yoke 19 is cancelled by an alternating field, which is produced by an alternating current in the winding 21 and which is attenuated over time. In this way the material of the magnet yoke 19 is demagnetised. The helical spring 18 is then able to force the anchor plate 17 away from the magnet yoke 19. The anchor plate 17 can then freely rotate with the worm shaft 12. The blocking of the steering wheel 2 is released.

The arrangement of magnet yoke 19, coil 21 and anchor plate 17 has to be implemented in a particularly compact and energy-saving manner in the aforedescribed way, since the necessary blocking of the steering shaft 2 is effected via the reduction of the toothing between the worm wheel 11 and the worm shaft 12, and the necessary torque that has to be generated for the blocking is reduced corresponding to the reduction ratio in the gear toothing.

The arrangement of anchor plate 17, magnet yoke 19 and winding 21 constructively forms a switchable magnetic brake that can be used to lock the steering shaft 2.

FIG. 3 shows a servo drive with a servomotor 14, which via a worm shaft 12 drives a worm wheel 11 and with it the upper steering shaft 2. These components are similar to those that have been described above in connection with FIG. 2. The shaft stub 16 of the worm shaft 12 facing away from the motor 14 is in the embodiment according to FIG. 3 connected to a differently implemented electromagnetic brake, which is described in more detail hereinafter. The illustration shows a locked position of the brake.

First of all the shaft stub 15 is rotatably mounted in a roller bearing 21 opposite a bearing seat 22 fixed to the housing. The bearing seat 22 is surrounded by an annular magnet yoke 23, which is of substantially rotationally symmetrical shape and whose cross-section is roughly U-shaped, wherein an annular groove 24 of rectangular cross-section pointing in the direction of the axis 20 towards the worm shaft 12 is provided in the interior of the magnet yoke 23. An annular permanent magnet 25 lies in the groove 24. The permanent magnet 25 lies on the base of the groove, i.e. facing away from the worm shaft 12. On the permanent magnet 25 a winding 26 is arranged in the groove 24, the winding also being annularly accommodated in the groove 24. The winding 26 is provided with electrical connections 27 in the manner of a magnet coil, which are arranged so as to feed a current to the winding 26.

The magnet yoke 23 sits with its outside in a torque-resistant manner in a pot-shaped housing part 28, which forms part of the housing 10. The pot-shaped main housing part surrounds the magnet yoke 23 on its outside and forms an annular flange 29, against which the magnet yoke 23 abuts with its likewise annular front surface 30 externally surrounding the groove 24. The magnet yoke 23 is immovably fixed in the housing 10 with fastening means, not shown in more detail, for example with a housing cover closing the housing part 28 on the left, or a bolt or screw arrangement or in some other way.

The groove 24 is partly covered by a yoke plate 31, wherein the yoke plate 31 abuts against the inner annular front surface of the magnet yoke 23 and against the front side of the winding 26 accessible from the open side of the groove 24, and is fastened there. The outside of the yoke plate 31 together with the magnet yoke 23 externally surrounding it defines an air gap 32. To this end the outer groove band of the groove 24 of the magnet yoke 23 projects beyond the inner groove band in the axial direction of the axis 20 by an amount corresponding to the thickness of the yoke plate 31. The groove 31 is further bounded by two surrounding ribs, which are formed on the outer circumference of the yoke plate 31 and on the inner circumference of the front side 30 in the axial direction of the axis 20 so that they point away from the groove 24.

The shaft stub 15 carries, as illustrated in FIG. 2, a non-circular region 16, which can be formed for example as a plurality of teeth or as two surfaces. The non-circular region 16 carries a substantially rotationally symmetrical anchor plate 35 in a torque-resistant manner, but axially displaceable in the direction of the axis 20, which in this exemplary embodiment is composed in two parts consisting of an annular anchor plate and a boss 36. The anchor plate 35 is forced by a spring 37 in the direction of the axis 20 away from the bearing seat 22 and the magnet yoke 23. A riding surface 38 is also provided between the yoke plate 31 and the anchor plate 35, which has to be fastened in a torque-resistant manner to one of the two plates.

A detail emphasised in FIG. 3 is identified as IV. This detail can be understood better in FIG. 4 in an enlarged representation. In FIG. 4 the released or open state of the vehicle immobiliser is however shown. The same components are provided with the same reference numerals. When the vehicle is in operation the brake device illustrated in FIGS. 3 and 4 is in a switching state in which the anchor plate 35 is spaced from the yoke plate 31. In this switching state of the brake device the steering shaft 2 is freely rotatable in a conventional manner depending on the actuation of the steering wheel 1. The worm wheel 11 rotates together with the steering shaft 2. Due to the engagement in the worm wheel 11 the worm shaft 12 also rotates with the motor shaft of the servomotor 14 and with the anchor plate 35 arranged in a torque-resistant manner on the worm shaft 12 in the non-circular region 16. The spring 37 ensures that the distance between the anchor plate 35 and the yoke plate 31 is maintained, so that the free rotation of the worm shaft 12 is not hindered by a contact in the region of the friction lining 38.

When the vehicle is not in operation and is to be safeguarded against unauthorised use, the winding 26 is supplied with current via the connections 27 shortly before a control operation. The resultant magnetic field causes the anchor plate 35 to be attracted against the force of the spring 37 towards the surrounding ribs 33 and 34, since the arrangement endeavours to close the magnetic circuit as far as possible. The anchor plate 35 then abuts, with interposition of the friction lining 38, against the yoke plate 31. The permanent magnet 25 produces at the same time a magnetic field in the magnet yoke 31, which after the electrical current in the winding 26 has been switched off is sufficiently large to hold the anchor plate 35 in this position against the action of the spring 37 and to develop a definite pressing force. The magnetic field of the permanent magnet 25 is on the other hand not sufficiently large so as to attract the anchor plate 35 from the freely rotatable position illustrated in FIG. 4 into the abutting position illustrated in FIG. 3. In order to change the switching state from the released position into the attracted or braked position, a brief supply of current to the winding 26 is therefore necessary. The current direction in the winding 26 should in this connection be such that the field of the permanent magnet 25 is strengthened.

In the described switching position illustrated in FIG. 3 the brake device is thus blocked, since there is frictional engagement between the anchor plate 35 and the yoke plate 31. Static friction exists up to a certain limiting torque on the worm shaft 12. The limiting torque can be calculated from the pressing force, the coefficient of static friction in the region of the friction lining 38, and from the radius of the anchor plate 35. As in the aforementioned example relating to FIG. 2, the brake device can for example withstand a maximum torque of up to 12 Nm. If the transmission through the engagement of the worm shaft 12 in the worm wheel 12 has a ratio of 20:1, then the brake device produces a retaining torque of 240 Nm on the steering shaft. This is sufficient in order to act as a vehicle immobiliser. If the torque on the steering shaft 2 is exceeded, then the brake device slips without however being released. A controlled steering of the vehicle is thus impossible. A torque limitation is however reached, which with an appropriate design of the steering shaft prevents damage to the steering shaft due to misuse.

If the vehicle is restarted, then the vehicle immobiliser must be released. For this purpose the winding 26 is fed for a short time with current from a control arrangement. In this connection the current flows in a direction that produces a reverse magnetic field to the field of the magnet 25. This magnetic field is calculated in terms of direction and intensity so that it cancels as precisely as possible the action of the permanent magnet 25. In this state the anchor plate 35 is no longer attracted towards the yoke plate 31. The spring 37 can move the anchor plate 35 away from the yoke plate 31, so that the brake device changes to the released switching state. Since the anchor plate 35 moves away from the air gap 32 it therefore also travels so far beyond the range of the magnetic field of the permanent magnet 25 that, after the current through the winding 26 has been switched off, the aforedescribed decoupled or released switching state of the brake device still remains.

A further exemplary embodiment of the invention is illustrated in FIG. 5.

FIG. 5 shows the steering wheel 1, which is connected to the steering shaft 2. The steering shaft 2 is surrounded by a coaxial servomotor 40, which sits in the manner of a tubular motor on the steering shaft 2. A motor shaft 41 is mounted via roller bearings 42 in a motor housing 43. The motor shaft 41 surrounds the steering shaft to form an intermediate space and is coupled in a torque-resistant manner to the steering shaft 2 only via a gear mechanism 44.

The motor shaft 41 drives a reducing gear 44, not described in more detail, that converts the rotation of the motor shaft 41 for example in a reduction ratio of 20 to 1 into a corresponding slower rotation of the steering shaft 2. The motor housing 43 is, corresponding to the housing 10 of FIG. 1, arranged fixed in the body of the vehicle. Supplying the electric motor 41 with current depending on a control arrangement consequently provides in a known manner servo assistance to the steering shaft 2 and thus to the steering torque to be exerted by the driver on the steering wheel 1.

The steering shaft 2 is mounted in the gear mechanism 44. On the under side of the arrangement illustrated in FIG. 5 the steering shaft 2 is rotatably mounted in a roller bearing 45, that has its seat in a housing part 46. The housing part 46 thus carries, like the housing 43, a brake arrangement identified overall by the reference numeral 47, which is basically of the same design and construction as the electromagnetic brake illustrated in FIGS. 3 and 4. Also, identical structural parts are identified by the same reference numerals. Here too the magnet yoke 23 is of annular shape and is provided with a groove 24 of rectangular cross-section open to the electric motor 40. The permanent magnet 25 sits on the base of the groove. The winding 26 in turn also lies in the groove on the permanent magnet 25. The electrical connection 27 supplies the winding 26 with electric current depending on a control arrangement. The magnet yoke 23 sits in the annular seat of the housing part 28 and is fixed there in a torque-resistant manner and consequently also together with the housing 43 to the vehicle body. The yoke plate 31 lies on the winding 26 and forms with the magnet yoke 23 an air gap, in which the magnetic field of the permanent magnet 25, and when supplied with current also of the winding 26, assumes a particularly large value. The motor shaft 41 carries by way of variation from the exemplary embodiment of FIGS. 3 and 4 an anchor disc 48 in a torque-resistant manner, which is described in more detail hereinafter. For this purpose reference is made to FIGS. 6 and 7, which show the detail V of FIG. 5 in an enlarged representation and in two different switching positions.

The motor shaft, not illustrated, which is rotatably mounted in the roller bearing 42 opposite the housing 43, carries the boss 36, which is fixed and arranged in a torque-resistant manner on the motor shaft in the axial direction. The boss 36 carries the anchor disc 48 made of a non-magnetisable material. The anchor disc 48 is formed in one piece and has a circular diameter extending beyond the diameter of the air gap 32. On its inner circumference the anchor disc comprises a sleeve-shaped section 49 pointing in the axial direction of the axis 22, with which the anchor disc 48 is fixed to the boss 36 and therefore also to the motor shaft. The anchor disc 48 is made of a non-magnetisable material and, on account of the magnetic field produced by the permanent magnet 25, is attracted towards the magnet yoke 23 and towards the yoke plate 31, so that on account of the resultant static friction the motor shaft is blocked up to a certain torque with respect to the magnet yoke 23 and thus with respect to the housing 43 fixed to the vehicle body.

The arrangement illustrated in FIG. 5 of the gear mechanism 44, steering wheel 1, electric motor 40, and brake 47 in relation to its axial position should be understood only as an example. Other arrangements are conceivable and possible.

As was described above in connection with FIG. 3 and FIG. 4, the closure of the brake in the illustrated frictionally locked state is achieved by briefly supplying the winding 26 with current in such a way that the resultant magnetic field is in the same direction as the magnetic field of the permanent magnet 25, whereby the anchor disc 48 is attracted towards the magnet yoke 23. The magnetic field of the permanent magnet 25 is then sufficient in order to hold the anchor disc 48 in this position. The renewed switching over to the freely rotatable switching state of the brake arrangement 47 is effected by supplying the winding 26 again with current in such a way that a reverse magnetic field to the magnetic field of the permanent magnet 25 is produced, so that the magnetic field in the air gap 32 becomes smaller. The anchor disc 48 then springs into the position illustrated in FIG. 7. In this position the anchor disc 48 is connected as before in a torque-resistant manner to the motor shaft via the boss 36. However, it no longer abuts against the magnet yoke 23 and the yoke plate 31.

The motor shaft is thereby freely rotatable relative to the brake arrangement 47 and relative to the housing 43 fixed to the vehicle body. In order to implement the vehicle immobiliser the latter should be designed in such a way that a current is again required in order to close the brake. Accordingly the permanent magnet 25 need only be designed sufficiently powerful so that the anchor disc 28 cannot be attracted over the air gap away from the spring-released position into frictional engagement. Accordingly, to release the vehicle immobiliser only a brief flow of current is necessary, which cancels the action of the permanent magnet 25. In order to lock the vehicle immobiliser current must be fed to the winding 26, which intensifies the action of the permanent magnet 25 in such a way that the anchor disc 48 is attracted against the action of the spring and frictional contact with the yoke plate 31 is achieved. If then the flow of current to the winding 26 is stopped, the magnetic field of the permanent magnet 25 is sufficient to maintain the frictional engagement connection.

In order to exhibit this property, the anchor disc 45 is formed in the manner of a disc spring. The slightly conical position that is illustrated in FIG. 7 is the destressed position or rest position of the anchor disc 48. In the flat position according to FIG. 5 and FIG. 6 the anchor disc 48 is deformed only by external application of force. When this force is released, the anchor disc 48 springs back into the position shown in FIG. 7.

FIGS. 8 and 9 show the anchor disc 48 from FIGS. 5, 6 and 7 in an enlarged perspective view seen from two sides. The anchor disc 48 has a substantially flat annularly shaped region 50 with an outer edge 51 and an inner edge 52. A sleeve-shaped section 53 is fastened to the inner edge 52, with which section the anchor disc 48 is fastened to the boss 36 of FIGS. 5 to 7. The annular region 50, as has already been described, is in the unstressed state slightly conically shaped in the manner of a helical spring. By applying an external force in the region of the outer circumference 51 the region 50 can be deformed, in particular into the exactly planar configuration of FIG. 6. When this force is released the region 50 snaps back again into the slightly conical original shape.

FIG. 10 shows finally an anchor disc 48, in which the stiffness of the angular region 50 is reduced by a surrounding circular bead 54 mounted in the vicinity of the inner edge 52. The annular region 52 is, as in the other exemplary embodiments, slightly conically shaped in the rest state. By applying an external force in the region of the outer edge 51 the region 50 can be transformed into a flat configuration, so that when used in the brake arrangement 47 the frictionally locked switching position according to FIG. 5 and FIG. 7 is adopted. The bead 54 facilitates the transformation of the anchor disc 48 into this flat state. The external force that is then needed to deform the annular region 50 is reduced. Nevertheless, when the external force is removed, i.e. when the magnetic fields of the winding 26 and of the permanent magnet 25 cancel when the vehicle immobiliser is switched off, the anchor disc 48 snaps back into the conical state, in which the brake arrangement 47 can freely rotate.

As far as is technically possible different features of the exemplary embodiments described above can also be combined with one another and interchanged without going beyond the scope of the invention. It is obvious that the combinations of the various embodiments illustrated in the examples for the brake and the various embodiments for the electrical auxiliary power assistance can also be interchanged.

Solutions with electrical auxiliary power assistance are intentionally selected as examples in order to illustrate as many elements of the invention as possible. If the electric motor 14 corresponding to the embodiment according to FIGS. 1 to 4 is omitted, then the worm shaft 12 coupled in a torque-resistant manner to the motor shaft 141 together with its shaft stub 15 and its region 16 forms the auxiliary shaft, which is coupled in a torque-resistant manner to the steering shaft 1. The torque-resistant coupling is accomplished via the toothed engagement between the worm shaft 12 and worm wheel 11. If the electric motor 14 corresponding to the embodiment according to FIG. 5 is omitted, then the motor shaft 41 forms the auxiliary shaft, which is coupled in a torque-resistant manner to the steering shaft 1. In this case the torque-resistant coupling is accomplished via the gear mechanism 44.

| Reference numerals | |
|---|---|
| 1. | Steering wheel |
| 2. | Steering shaft |
| 3. | Steering shaft |
| 4. | Pinion |
| 5. | Gear rack |
| 6. | Steering housing |
| 7. | Track rods |
| 8. | Wheels |
| 9. | Bracket |
| 10. | Housing |
| 11. | Worm wheel |
| 12. | Worm shaft |
| 13. | Connection |

-continued

| Reference numerals | |
|---|---|
| 14. | Servomotor |
| 15. | Shaft stub |
| 16. | Region |
| 17. | Anchor plate |
| 18. | Helical spring |
| 19. | Magnet yoke |
| 20. | Front surface |
| 21. | Winding |
| 22. | Air gap |
| 23. | Magnet yoke |
| 24. | Groove |
| 25. | Permanent magnet |
| 26. | Winding |
| 27. | Connections |
| 28. | Housing part |
| 29. | Annular flange |
| 30. | Front surface |
| 31. | Yoke plate |
| 32. | Air gap |
| 33. | Rib |
| 34. | Rib |
| 35. | Anchor plate |
| 36. | Boss |
| 37. | Spring |
| 38. | Friction lining |
| 40. | Servomotor |
| 41. | Motor shaft |
| 42. | Roller bearing |
| 43. | Motor housing |
| 44. | Reduction gear |
| 45. | Roller bearing |
| 46. | Housing part |
| 47. | Brake arrangement |
| 48. | Anchor disc |
| 49. | Section |
| 50. | Annular region |
| 51. | Outer circumference |
| 54. | Bead |
| 141. | Motor shaft |

What is claimed is:

1. A steering system including:
an uninterruptible mechanical positive coupling between a steering wheel and a pinion in the form of a steering shaft;
an auxiliary shaft, which is coupled in a torque-resistant manner via a reduction gear mechanism to the steering shaft; and
a switchable magnetic brake, which in an open switching state is configured to release the auxiliary shaft so that the auxiliary shaft can rotate in a fixed transmission ratio with the steering shaft, and which in a closed switching state is configured to lock the auxiliary shaft frictionally with respect to a holder fastened to the vehicle body, wherein the magnetic brake comprises a yoke fixed to the vehicle body and an anchor configured to be able to rotate with the auxiliary shaft, wherein a frictional grip between the anchor and the yoke can be produced by means of a magnetic force.

2. The steering system according to claim 1, wherein the auxiliary shaft comprises a motor shaft of a servomotor of an electrical auxiliary power assistance.

3. The steering system according to claim 1, wherein the magnetic brake is shielded by an encapsulation against external magnetic fields.

4. The steering system according to claim 1, wherein the magnetic brake further comprises a friction lining or a coating configured to increase static friction between the anchor and the yoke.

5. The steering system according to claim 1, wherein the anchor is formed self-resilient, wherein an anchor disc in an unstressed position corresponding to the open position of the magnetic brake has a conical shape, and wherein the anchor disc can be converted under the influence of the magnetic field into a flat shape that effects the closed position of the magnetic brake.

6. The steering system according to claim 1, wherein the magnet yoke or the anchor is/are provided with a permanent magnet wherein a magnetic field strength of the permanent magnet is arranged so that simply on account of the field strength of the permanent magnet the brake cannot be converted into closed state.

7. The steering system according to claim 1, further including a spring configured to tension the magnetic brake into an open position.

8. The steering system according to claim 7, wherein the motor shaft comprises a hollow shaft surrounding the steering shaft wherein the reduction gear is arranged on one side of the auxiliary shaft, and wherein the magnetic brake is arranged on side of the auxiliary shaft lying opposite the reduction gear.

9. The steering system according to claim 1, wherein the auxiliary shaft is coupled to a motor shaft of a servomotor of an electrical auxiliary power assistance to introduce an assistance torque into the steering system.

10. The steering system according to claim 9, wherein the reduction gear is implemented as a worm gear, wherein a worm shaft is directly coupled in a torque-resistant manner to the auxiliary shaft.

11. The steering system according to claim 9, wherein the reduction gear comprises a gear mechanism coaxially surrounding the steering shaft.

* * * * *